Jan. 6, 1942.  N. PELOSI  2,268,613
CAN BODY MAKING MACHINE
Filed Aug. 22, 1940  2 Sheets-Sheet 2
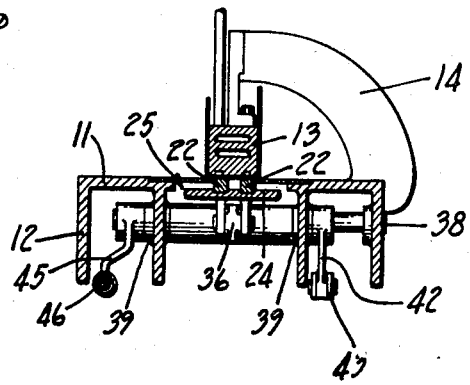
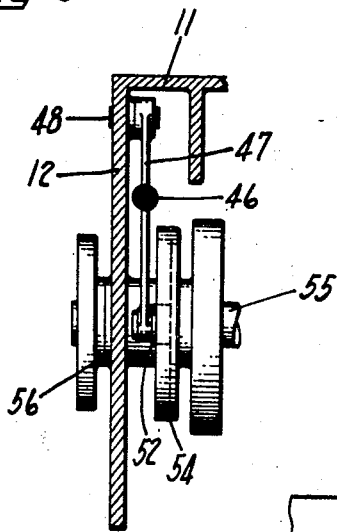
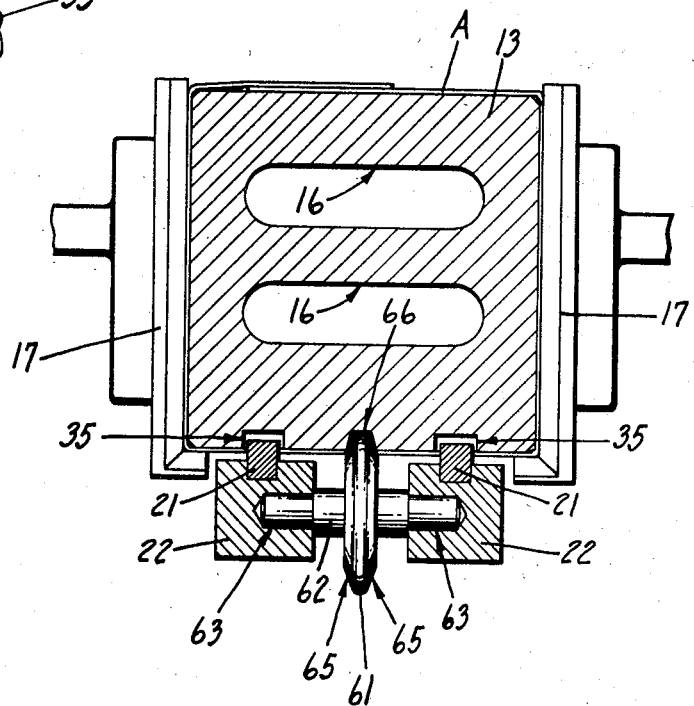
INVENTOR.
Nicholas Pelosi
BY Ivan D. Thornburgh
Chas. H. Erne
ATTORNEYS Patented Jan. 6, 1942

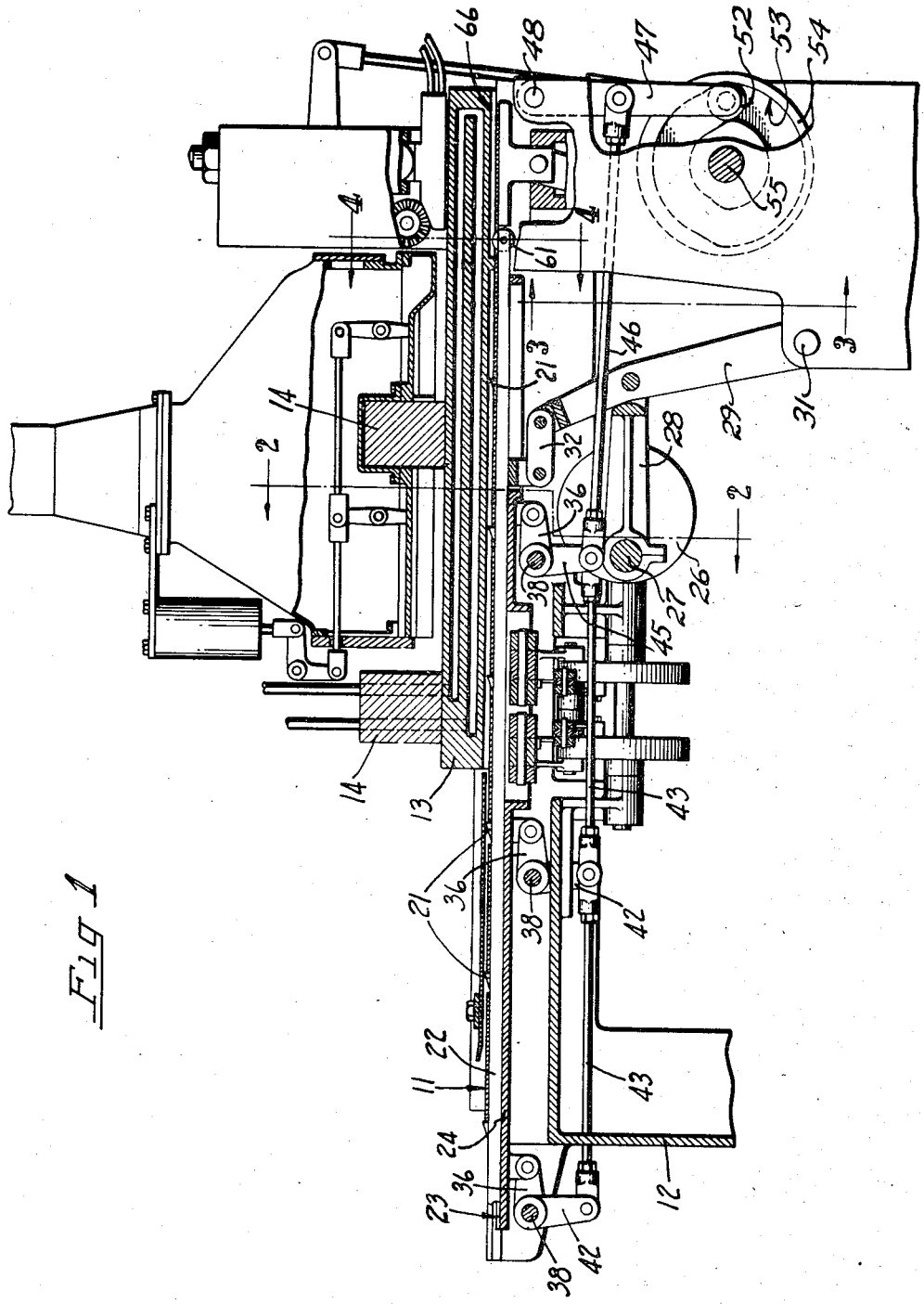

2,268,613

UNITED STATES PATENT OFFICE 2,268,613

CAN BODY MAKING MACHINE

Nicholas Pelosi, Newark, N. J., assignor to American Can Company, New York, N. Y., a corporation of New Jersey Application August 22, 1940, Serial No. 353,768

5 Claims. (Cl. 93—49)

The present invention relates to can body making machines of the character which includes a can body forming horn having one end overhanging and unsupported and has particular reference to maintaining the horn in a predetermined position to prevent pinching of the can bodies as they are advanced along the horn. This is an improvement on the Can body maker disclosed in United States Patent 2,169,311, issued August 15, 1939, to M. E. Widell.

In can body making machines having forming horns which are unsupported at one end to permit the discharge of the bodies from the horn, the vibration of the machine often so vibrates the horn that its unsupported end shifts out of place and pinches the can bodies against the side guides of the machine. Hence when the feeding devices come into action to advance the pinched bodies along the horn the bodies are often deformed or totally destroyed, especially when they are made of light weight fibrous material.

In order to overcome this difficulty the instant invention contemplates a horn centralizing device which maintains the unsupported end of the horn in a centralized position between the machine side guides so that the can bodies on the horn may pass freely therealong.

An object therefore of the invention is the provision in a can body making machine having a can body forming horn which is unsupported at one end, of devices which maintain the unsupported end of the body in a centralized position relative to the can body side guides so that the bodies will advance freely along the horn without being pinched against the side guides.

Another object is the provision in such a machine of horn centralizing devices which travel with the body feeding devices in such a manner that the horn is positively maintained in a central position and supported adjacent its outer end while the can bodies are being advanced along the horn.

Another object is the provision in a machine of this character of feeding devices which reciprocate adjacent the horn and which shift toward and away from the horn during the can body advancing operation so that the centralizing devices may function on one stroke of the feeding devices and remain idle on the return stroke to prevent interference of the centralizing devices with the cam bodies on the horn.

Numerous other objects and advantages of the invention will be apparent as it is better understood from the following description, which, taken in connection with the accompanying drawings, discloses a preferred embodiment thereof.

Referring to the drawings:

Figure 1 is a longitudinal vertical sectional view taken through a can body making machine embodying the instant invention, with parts broken away;

Figs. 2 and 3 are sectional views taken substantially along the lines 2—2, 3—3 in Fig. 1, with parts broken away; and Fig. 4 is an enlarged sectional view taken substantially along the line 4—4 in Fig. 1.

As a preferred embodiment of the instant invention the drawings illustrate the principal parts of a can body making machine of the character disclosed in the above mentioned Widell patent.

In such a machine flat fibre can body blanks are advanced in a step-by-step manner and in a horizontal position along the top of a bed 11 (Figs. 1 and 2) which may be a part of a machine main frame 12. During their advancement along the bed the blanks are moved along and under a stationary body forming horn or mandrel 13 which is preferably suspended in spaced relation to the top of the bed so the blanks may readily pass under it. At working stations arranged adjacent the horn the flat body is wrapped around the horn and its side seam edges are secured together to produce a can body A (Fig. 4) by pressure on an adhesive joint.

The horn is secured to a pair of overhanging brackets 14 which are bolted to the bed. The brackets are located adjacent the inner end of the horn so that its outer end will be unsupported and free of obstructions to permit discharge of the can bodies.

The drawings illustrate a rectangular shaped horn to produce a container of rectangular cross section, preferably square. Passageways 16 are provided in the horn for the circulation of a heating medium therethrough if it is desired to maintain the horn in a heated condition. Stationary side guides 17 are also located adjacent the discharge end of the horn to guide the folded body and to hold it against the horn.

Advancement of the blanks and the folded can bodies is preferably brought about by spaced feed dogs 21 carried in a pair of spaced and parallel reciprocating feed bars 22 which operate in grooves 23 formed in the top of a vertically movable table or carriage 24 located in an opening 25 formed in the bed 11. The feed bars are reciprocated by an eccentric disc 26 mounted on a continuously rotating shaft 27 journaled in suitable bearings formed in the main frame 12. The eccentric disc is connected by a crank 28 to a substantially vertical arm 29 mounted on a pivot pin 31 carried in the main frame. The upper end of the arm is connected by a link 32 to the feed bars.

Hence as the eccentric disc 26 rotates and rocks the arm 29, it moves the feed bars 22 in their grooves 23 on a forward feeding stroke and thence on a return stroke. On the forward stroke of the feed bars the feed dogs 21 operate in clearance grooves 35 formed in the bottom of the horn so that the dogs will properly engage the blanks and can bodies.

On the return stroke of the feed bars the table 24 is moved vertically downward so that the feed dogs 21 will clear the blanks and bodies as the feed bars move rearwardly. For this purpose the table 24 is supported on a plurality of substantially horizontal arms 36 located at spaced intervals along the length of the table. The arms are mounted on pivot shafts 38 carried in bearings 39 formed in the main frame 12. Each pivot shaft carries a depending lever 42 and these levers are connected together by connecting rods 43.

The innermost pivot shaft 38 also carries an actuating lever 45 which is connected by a link 46 to a vertically disposed rocker arm 47 located adjacent the discharge end of the machine. The upper end of the arm is mounted on a pivot pin 48 carried in the main frame. The lower end of the arm carries a cam roller 52 which operates in a cam groove 53 of a face cam 54 mounted on a cross shaft 55. The shaft 55 is journaled in bearings 56 formed in the main frame. This shaft is preferably the main drive shaft of the machine and may be rotated in any suitable manner.

Hence as the rotating cam 54 shifts the rocker arm 47 it oscillates the levers 42 and arms 36 in unison. This rocking of the levers and arms raises and lowers the table 24 in time with the actuation of the feed bars 22 so that the dogs may be alternately moved into and out of feeding relation to the blanks and the bodies.

In order to prevent pinching of the moving container bodies A against the side guides 17 when the unsupported end of the horn vibrates or warps laterally, as when heated, the horn is engaged and held in a central position relative to the side guides when the feed bars move through a forward stroke to advance the blanks and bodies along the horn and to discharge the finished body from the outer end of the horn. This centralizing function is preferably effected by a centralizing roller 61 (Figs. 1 and 4) which travels with the feed bars 22.

The centralizing roller 61 is mounted between the spaced feed bars 22 on a short shaft 62 the ends of which are carried in bearings 63 formed in the feed bars. The roller is preferably located adjacent the last pair of feed dogs 21, i. e., adjacent the discharge end of the horn and longitudinally is between the spaced bodies A on the horn. The roller is formed with tapered sides 65 which give it a wedge shaped periphery. This roller is adapted to fit into a wedge shaped longitudinal groove 66 formed in the bottom of the horn.

Hence when the table or carriage 24 moves upwardly to bring the returned feed bars into position for a forward stroke, the centralizing roller 61 moves up into the centralizing groove 66 of the horn 13 and holds or shifts the unsupported end of the horn into a centralized position between the side guides 17. As the feed bars 22 move through their forward or feeding stroke the roller moves with them, running along the centralizing groove 66 and thus maintaining the horn in a centralized position while the body at the discharge end of the horn passes along the horn and off the outer end thereof to a suitable place of deposit.

At the end of this stroke the roller 61 moves downwardly with the feed bars and with the table 24 and thus withdraws from the horn groove 66. It will clear the next following body on the horn when the feed bars move back on their return stroke. When the feed bars again move up with the table for the next feeding stroke the roller 61 again finds its horn groove 66 and thereby brings the horn back into a centralized position if it should be warped or otherwise displaced. In such position it is always in readiness for the feeding stroke.

The unsupported end of the horn thus keeps in a centralized position relative to the stationary side guides 17 as it is positively centered at each feeding stroke. By such a provision the container bodies A are free to move along the horn and off its outer end without being pinched or otherwise retarded by the side guides 17.

It is thought that the invention and many of its attendant advantages will be understood from the foregoing description, and it will be apparent that various changes may be made in the form, construction and arrangement of the parts without departing from the spirit and scope of the invention or sacrificing all of its material advantages. the form hereinbefore described being merely a preferred embodiment thereof.

I claim:

1. In a can body making machine, the combination of a forming horn having one end overhanging and unsupported for forming and supporting can bodies, feeding devices adjacent said forming horn for advancing the bodies therealong, guide rails adjacent said forming horn, and means disposed adjacent the unsupported end of the horn and engageable therewith at each feeding movement of said devices for centralizing it between said guide rails when the can bodies are advanced along the horn so that they will not be pressed against the guide rails by shifting movement of the horn.

2. In a can body making machine, the combination of a forming horn having one end overhanging and unsupported for forming and supporting can bodies, feeding devices adjacent said forming horn for advancing the bodies therealong, guide rails adjacent said forming horn, and means disposed adjacent the unsupported end of the horn movable with the feeding devices into engagement with the horn at each feeding stroke of said devices for centralizing the horn between said guide rails when the can bodies are advanced along the horn so that they will not be pressed against the guide rails by lateral shifting movement of the horn.

3. In a can body making machine, the combination of a forming horn having one end overhanging and unsupported for forming and supporting can bodies, said horn having a longitudinal groove in its bottom surface adjacent its unsupported end, reciprocating feed bars adjacent said forming horn for advancing the bodies therealong, guide rails adjacent said forming horn, and a roller carried by said feed bars and operable in the groove in said forming horn for maintaining the horn in a centralized position relative to said guide rails to prevent pinching of the can bodies against the rails as the bodies are moved along the horn.

4. In a can body making machine, the combination of a forming horn having one end overhanging and unsupported for forming and supporting can bodies, said horn having a longitudinal groove in its bottom surface adjacent its unsupported end, reciprocating feed bars adjacent said forming horn, a roller carried by said feed bars which is located between the spaced can bodies on said horn and operable in the groove in said horn for maintaining the horn in a centralized position relative to said guide rails to prevent pinching of the can bodies against the rails as the bodies are moved along the horn, and means for shifting said feed bars and the roller carried thereby away from said horn on the reverse stroke of the bars to insure clearance of the roller from the can bodies on the horn.

5. In a can body making machine, the combination of a forming horn having one end unsupported for forming and supporting can bodies, said horn having a longitudinal groove in its bottom surface adjacent its unsupported end, guide rails adjacent said forming horn, reciprocating feed bars also adjacent said forming horn for advancing a procession of can bodies therealong in spaced relation, a roller carried by said feed bars and disposed between the spaced can bodies, means for reciprocating said feed bars, a movable carriage adjacent said horn for supporting said feed bars, and means for shifting said carriage toward and away from said horn in time with the reciprocation of said feed bars to insert said roller into the groove of the horn to centralize the latter relative to said guide rails on the body advancing stroke of the feed bars and to prevent pinching of the bodies against the rails as they are moved along the horn and to withdraw the roller from the horn groove on the return stroke of the feed bars to prevent it from engaging the bodies on the horn.

NICHOLAS PELOSI.